United States Patent [19]
Risky
[11] 3,714,556
[45] Jan. 30, 1973

[54] ELECTRO-MAGNETIC CURRENT-SENSING SCANPOINT MATRIX HAVING MEANS FOR DETECTING AND ISOLATING ELECTRICAL FAILURES WITHIN THE MATRIX

[75] Inventor: Frank A. Risky, Cicero, Ill.
[73] Assignee: GTE Automatic Electric Laboratories Inc., Northlake, Ill.

[22] Filed: Dec. 8, 1971
[21] Appl. No.: 205,806

[52] U.S. Cl..........324/34 R, 179/18 FF, 179/175.2 R
[51] Int. Cl. ..............................................G01r 33/00
[58] Field of Search .....324/34 R, 34 CT; 179/18 FF, 179/18 FG, 175.2 R; 340/174 CT, 174 TC

[56] References Cited

UNITED STATES PATENTS

| | | | |
|---|---|---|---|
| 3,254,157 | 5/1966 | Guercio et al. | 179/18 FF |
| 3,524,933 | 8/1970 | Risky | 179/18 FG |

*Primary Examiner*—Robert J. Corcoran
*Attorney*—K. Mullerheim et al.

[57] ABSTRACT

The linear ferrite cores of an electromagnetic scan point matrix are provided with a test winding wired in opposition to the control windings which are coupled to the monitored contacts. Selective application of a test voltage to the test windings reverses the logical output signals from the matrix and the failure of a given scanpoint output to reverse is indicative of an electrical failure in that scanpoint.

6 Claims, 2 Drawing Figures

INVENTOR
FRANK A. RISKY
BY Robert Van Epps
ATTORNEY

ELECTRO-MAGNETIC CURRENT-SENSING SCANPOINT MATRIX HAVING MEANS FOR DETECTING AND ISOLATING ELECTRICAL FAILURES WITHIN THE MATRIX

BACKGROUND OF THE INVENTION

1. Field of the Invention

The present invention relates generally to the field of electronic scanners and more particularly to a new and improved electromagnetic scanpoint matrix having means for detecting electrical failures.

2. Description of the Prior Art

In various electrical and electronic systems there exists a requirement to monitor the states of a plurality of signal lines. To this end electromagnetic scanpoints have been extensively used to sense current flow in the signal lines. Typically a ferrite core is placed about the line to be monitored and current through the line operates to magnetically saturate the core. Drive and sense lines are also wound on the core such that when a current pulse is passed by the drive line a corresponding output pulse will or will not be induced in the sense line depending upon whether or not current is flowing in the monitored signal line.

Although electromagnetic scanpoint matrices have operated satisfactorily and have found wide acceptance, particularly in the telephone industry, provisions for the automatic detection and isolation of electrical failures in the matrix have not been available. In the telephone system applications, for example, an electrical failure in the electromagnetic scanpoint matrix gave no readily identifiable indication, and reliance thus had to be placed upon either customer complaints or the failure of the status of a given line to change over an inordinate period of time. Neither technique, of course, permitted regular testing of the matrix for electrical failures.

OBJECTS AND SUMMARY OF THE INVENTION

From the preceding discussion it will be understood that among the various objectives of the present invention are included:

the provision of a new and improved electromagnetic scanpoint matrix having integral means for detecting electrical failures therein;

the provision of apparatus of the above-described character which is operative to detect electrical failures without interrupting interrogation of the matrix; and the provision of apparatus of the above-described character which is economical of construction.

These as well as other objectives of the present invention are efficiently achieved by providing a conventional ferromagnetic scanpoint core including drive, sense and first and second control windings with an additional test winding. Both control windings are coupled to the signal line to be monitored. The drive winding is coupled to a driver circuit and the sense winding is coupled to an output sense amplifier. The test winding opposes the control windings coupled to the monitored line and is selectively coupled to a current source. When the test winding is activated, a magnetic field is produced in opposition to the control winding field which is produced if the control winding is activated by the monitored line. The result is a logical reversal of the sense winding output signals produced when the drive winding is interrogated. The failure of a given scanpoint output to reverse during a test is indicative of an electrical failure in that scanpoint.

The foregoing as well as other objects, features and advantages of the present invention will become more apparent from the following detailed description taken in conjunction with the appended drawings.

DESCRIPTION OF THE PREFERRED EMBODIMENT

Figure 1:
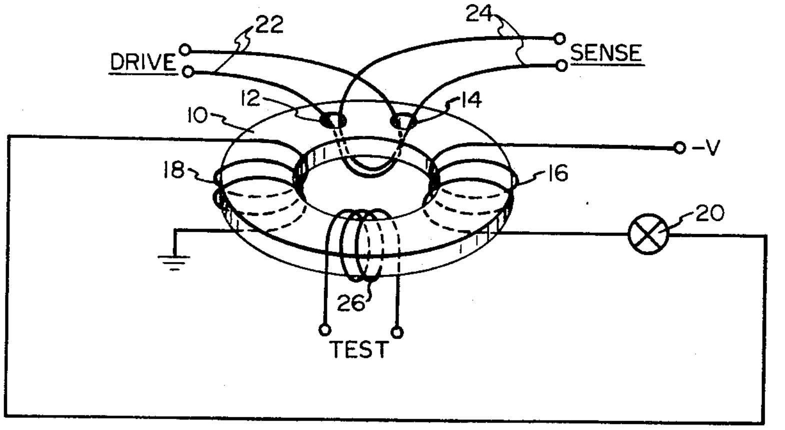
FIG. 1 is a schematic elevation view of a scanpoint core and windings in accordance with the present invention.

Turning now to FIG. 1 there is schematically illustrated a scanpoint core wound in accordance with the principles of the present invention. A toroidal core 10, formed of a linear (non-square-loop) ferrite material, has two closely spaced holes 12 and 14 located on the mean circumference of the toroid. First and second control windings 16 and 18 are wound on the body of the toroid structure. Windings 16 and 18 are coupled across a remote switch 20 in the line being monitored, to achieved longitudinal balance on the line. The windings 16 and 18 are also coupled across a voltage source, –V. A drive line 22 and a sense line 24 are threaded through the holes 12 and 14 in the conventional manner. A test winding 26 in accordance with this invention is wound around the body of the core 10 in a manner similar to the control windings 16 and 18.

Since the scanpoint core 10 is formed of a linear ferrite material it will relax after having been interrogated without the requirement of a reset pulse. To interrogate the scanpoint a current pulse is passed through the drive winding 22. If no current is flowing in the control windings 16 and 18 the drive current induces a large voltages via the core 10 in the sense winding 24 which may be amplified and used to indicate the state of the line or device being monitored, e.g., contacts 20. When currents is flowing through the control windings 16 and 18, however, given a sufficient ampere-turn product, the magnetic material in the vicinity of the holes 12 and 14 saturates thus reducing the coupling between the drive and sense windings 22 and 24 respectively to a very low level thus reducing the voltage induced in the sense winding 24 to a very small value. By observing the output of the sense winding while the drive winding 22 has a current pulse applied thereto, the current through the line can be monitored. The monitored line may, for example, be a subscriber or trunk line in a telephone system and the monitoring of circuit current thus permits supervision of the state of that line.

In normal operation no current flows in the test winding 26 and current in the control windings 16 and 18 may be either zero or sufficient to saturate the core. If the control current is zero the scanpoint when interrogated will have an output signal. If the control current is sufficient to saturate the core 10 there will be substantially no output on the sense winding 24 when the scanpoint is interrogated.

The ampere-turn product of the test winding 26 and the current direction therethrough is substantially equal but opposed to that of the control winding 16 which is coupled to the device being monitored 20. The effect when current is flowing in both the control winding 16 and the test winding 26 is that there will be no net magnetic field through the core 10. The scanpoint sense winding 24 output signals will thus have a response when current is passed through the drive winding 22 which is opposite to that described above for normal operation. It is this sense winding output reversal which may be used to advantage in detecting and isolating electrical failures in a scanpoint matrix made up of a multiplicity of elements such as that shown in FIG. 1.

Figure 2:
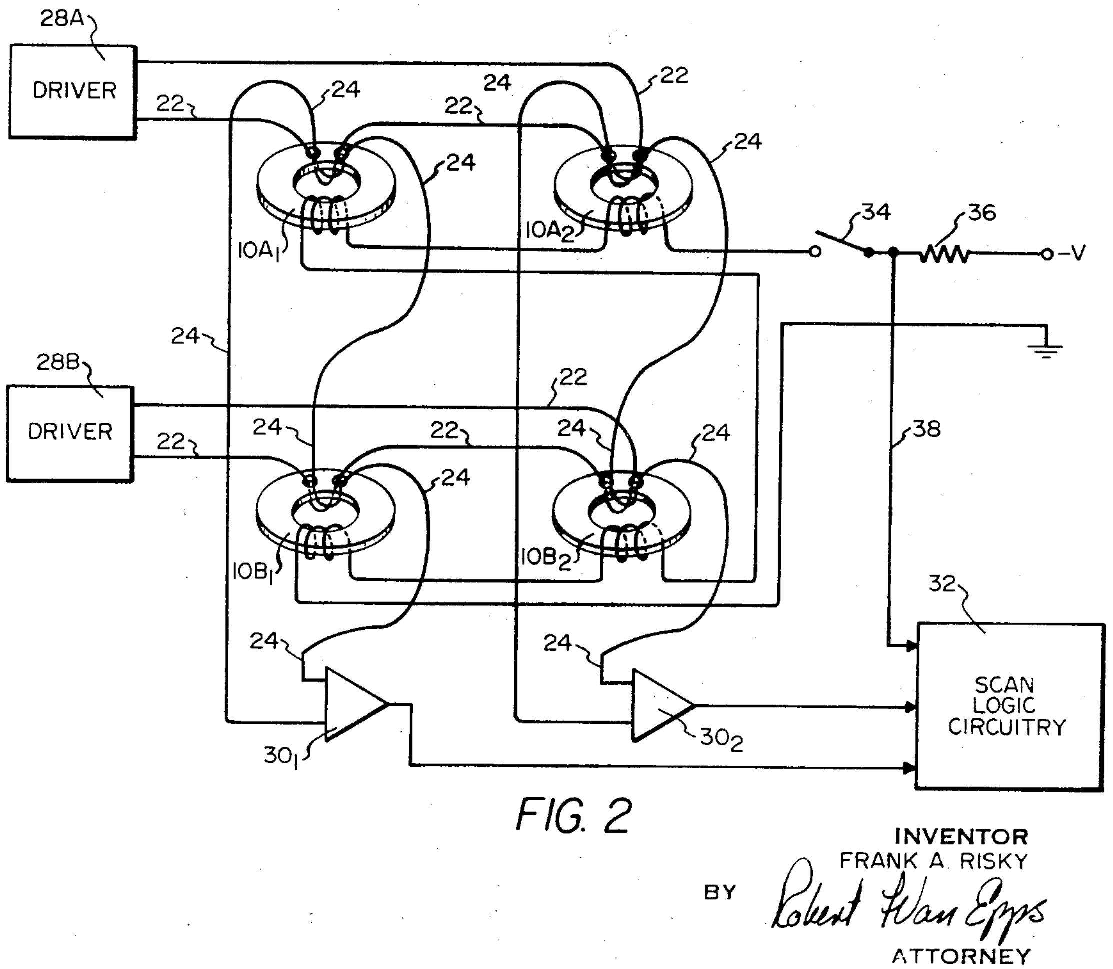
FIG. 2 is a schematic diagram of a simplified electromagnetic scanpoint matrix incorporating the features of the present invention.

With reference now to FIG. 2 there is illustrated in simplified schematic form a two-by-two scanpoint matrix fabricated in accordance with the present invention. Elements which correspond to those described with reference to FIG. 1 are identified by like reference numerals. The illustration is simplified for the purpose of clarity in that the control windings 16 and 18 of FIG. 1 are not shown in FIG. 2. It is, however, to be understood that each scanpoint core $10A_1$, $10A_2$, $10B_1$, and $10B_2$ of FIG. 2 is in practice wound as illustrated in FIG. 1.

The scanpoints 10 are typically arranged in a matrix of rows and columns. The drive windings 22 for each core 10 in a row are coupled in series to a row driver 28A and 28B respectively. The sense windings 24 for each core 10 in a column are coupled in series to a column sense amplifier $30_1$ and $30_2$ respectively. The outputs of the column sense amplifiers 30 are coupled to scan logic circuitry 32 of conventional design which will be familiar to those skilled in the art.

The test provision of the present invention is implemented by placing a test winding 26 on each core 10 in the matrix. The test windings are coupled on one side to ground potential and on the other to a test voltage source, −V, through a switching device 34, such as a relay or transistor switch, and input resistor 36. Thus, when the switching device 34 is in a conducting state the test voltage produces a current in each of the test windings 26 and, as described hereinabove, the scanpoint sense winding output signals coupled from sense amplifiers 30 to the logic circuitry 32 are reversed, i.e., a signal normally defined as a logical "1" becomes a logical "0" and vice versa. If, when the scanpoint output data in the test mode (i.e., switching device 34 closed) are not the mirror image of the data produced during the interrogation immediately preceding entry into the test mode, the particular bit or bits which did not change logical state are faulty and should be replaced.

In order that useful data may continue to be provided by the scanpoint matrix while it is being operated in the test mode, the test voltage may also be coupled via lead 38 to the logic circuitry 32. Thus the operating circuits may be conditioned to respond properly to the logical reversal of the matrix outputs.

It is preferred in the practice of this invention that the test windings 26 be wound in series for all the cores 10 in the matrix to avoid the necessity of duplicating the test switching device 34 and input resistor 36. It will be understood, however, if other system requirements are of more concern than economy, parallel or independent test circuitry of the type described may also be employed to advantage. The test windings 26 are shown for illustrative purposes only as having a plurality of turns, however, if such is desired a single turn test winding may be simply threaded through all the scanpoint cores in the matrix.

From the preceding description it will be seen that the Applicant has provided a new and improved electromagnetic scanpoint matrix whereby the objectives set forth hereinabove are efficiently met. Since certain changes will occur to those skilled in the art without departure from the scope of the invention it is intended that all matter contained in the description or shown in the appended drawings shall be interpreted as illustrative and not in a limiting sense.

Having described what is new and novel and desired to secure by Letters Patent, what is claimed is:

1. An improved electromagnetic scanpoint for monitoring a signal line, said scanpoint being of the type including a toroidal core formed of a substantially linear ferrite material having a pair of adjacent apertures disposed therethrough on substantially the mean circumference thereof, first and second control windings wound on the body of said core and coupled in series with said signal line and an electrical current source, a drive winding and a sense winding threaded through said apertures, means for applying pulses of current to said drive winding, means for sensing a voltage across said sense winding, and wherein said improvement comprises a test winding wound on the body of said core in opposition to said control windings, and means for selectively applying an electrical current to said test winding such that the ampere-turn product of said test winding is substantially equal and opposite to that of said control windings such that magnetic fields induced in said toroidal core are substantially cancelled when current flows in both said control and said test windings and application of a current pulse to said drive winding produces an output voltage pulse on said sense winding.

2. An improved electromagnetic scanpoint matrix for monitoring a plurality of signal lines, said matrix being of the type including an array of toroidal cores formed of a substantially linear ferrite material, each core having a pair of adjacent apertures disposed therethrough on substantially the mean circumference thereof, first and second control windings wound on the body of each said core and coupled in series with a signal line to be monitored and an electrical current source, a drive winding and a sense winding threaded through the apertures of each said core, means for applying pulses of current to the drive winding of each core in a row of said array, means for sensing a voltage coupled to the sense winding of each core in a column of said array, and wherein said improvement comprises a test winding wound on the body of each core in said array in opposition to said control windings, and means for selectively applying an electrical current to each of said test windings such that the ampere-turn product of each said test winding is substantially equal and opposite to that of said control windings such that magnetic fields induced in said toroidal cores are substantially cancelled when current flows in both said control and said test windings and application of a current pulse to said drive windings in a given row of said array produces an output voltage pulse on said sense winding in a corresponding column of said array.

3. Apparatus as recited in claim 2 wherein said selective current supplying means comprises a switching means and a current source through said switching means to each of said test windings.

4. Apparatus as recited in claim 2 wherein said selective current supplying means and all of said test windings are coupled in series.

5. Apparatus as recited in claim 2 wherein said current pulse applying means and said drive windings of each said core in a row of said array are coupled in series.

6. Apparatus as recited in claim 2 wherein said voltage sensing means and said sense windings of each said core in a column of said array are coupled in series.

* * * * *